United States Patent
Godin et al.

(10) Patent No.: US 11,412,403 B2
(45) Date of Patent: Aug. 9, 2022

(54) BENCHMARKING OF DELAY ESTIMATES IN A 5G NETWORK FOR QUALITY OF SERVICE FLOW SETUP AND MONITORING

(71) Applicant: NOKIA TECHNOLOGIES OY, Espoo (FI)

(72) Inventors: Philippe Godin, Versailles (FR); Devaki Chandramouli, Plano, TX (US); Bruno Landais, Pleumeur-Bodou (FR); Hakon Helmers, Sceaux (FR)

(73) Assignee: NOKIA TECHNOLOGIES OY, Espoo (FI)

( * ) Notice: Subject to any disclaimer, the term of this patent is extended or adjusted under 35 U.S.C. 154(b) by 154 days.

(21) Appl. No.: 16/836,120

(22) Filed: Mar. 31, 2020

(65) Prior Publication Data
US 2020/0314686 A1    Oct. 1, 2020

Related U.S. Application Data

(60) Provisional application No. 62/827,608, filed on Apr. 1, 2019.

(51) Int. Cl.
 *H04W 28/02* (2009.01)
 *H04W 24/08* (2009.01)
 *H04W 28/10* (2009.01)

(52) U.S. Cl.
 CPC ....... *H04W 28/0268* (2013.01); *H04W 24/08* (2013.01); *H04W 28/10* (2013.01)

(58) Field of Classification Search
 CPC ............ H04W 28/0268; H04W 28/10; H04W 28/0236; H04W 28/24; H04L 47/822; H04L 47/805; H04L 47/283; H04L 43/0852
 See application file for complete search history.

(56) References Cited

U.S. PATENT DOCUMENTS

| | | | | |
|---|---|---|---|---|
| 7,506,052 B2 * | 3/2009 | Qian | ..................... | H04L 67/306 709/227 |
| 10,230,605 B1 * | 3/2019 | Filsfils | ................... | H04L 43/12 |

(Continued)

OTHER PUBLICATIONS

European Search Report corresponding to EP Application No. 20167463.7, dated Aug. 12, 2020.

(Continued)

*Primary Examiner* — Hassan Kizou
*Assistant Examiner* — Hector Reyes
(74) *Attorney, Agent, or Firm* — Squire Patton Boggs (US) LLP

(57) ABSTRACT

According to certain embodiments, a method and apparatus may include performing, by a first network entity, at least one benchmarking procedure of at least one network hop delay per at least one transmit resource towards at least one peer network node identified by at least one internet protocol destination address. The method and apparatus may further include deriving, by the first network entity, a second table, by, for each peer node associated with an internet protocol destination address, determining at least one existing configured mapping of at least one network instance into a transport resource $T_i$ per internet protocol destination address. The method and apparatus may further include updating, by the first network entity, the first table and the second table for each internet protocol destination address and transmitting the updated second table to the second network entity.

9 Claims, 9 Drawing Sheets

| | Network instance 1 | Network instance 2 | Network instance 3 | Network instance 4 |
|---|---|---|---|---|
| DSCP 1 | 1 ms | 0.6 ms | 0.5 ms | 0.7 ms |
| DSCP 2 | 0.4 ms | 0.4 ms | 0.6 ms | |
| DSCP 3 | 0.8 ms | 0.2 ms | | |
| DSCP 4 | | 0.1 ms | | |

(56) References Cited

U.S. PATENT DOCUMENTS

| | | | | |
|---|---|---|---|---|
| 11,153,190 B1* | 10/2021 | Mahajan | ............... | H04L 45/24 |
| 2009/0198832 A1* | 8/2009 | Shah | ................. | H04L 43/10 |
| | | | | 709/239 |
| 2015/0281028 A1* | 10/2015 | Akhter | ............. | H04L 43/0858 |
| | | | | 370/252 |
| 2017/0142014 A1* | 5/2017 | Vincent | ............ | H04L 43/0864 |
| 2019/0253917 A1* | 8/2019 | Dao | ................. | H04W 28/0268 |
| 2020/0359244 A1* | 11/2020 | Yao | ................... | H04W 24/08 |

OTHER PUBLICATIONS

Nokia et al: "Accumulated packet delay estimation for QoS monitoring and division of PDB", SA WG2 Meeting #131, Feb. 25-Mar. 1, 2019, Santa Cruz—Tenerife, Spain, S2-1902072, 5 pages.

Elmasry et al: "Bottleneck Discovery in Large-Scale Networks Based on the Expected Value of Per-Hop Delay", 2003 IEEE Military Communications Conference, Milcom 2003, Boston, MA, Oct. 13-16, 2003, XP010698341, pp. 405-410.

Huawei et al: "Update the QoS monitoring solution for URLLC service", SA WG2 Meeting #129BIS, Nov. 26-30, 2018, West Palm Beach, FL, S2-1813071, 7 pages.

Blake S et al: "RFC 2475: An Architecture for Differentiated Services", Internet Citation, URL:ftp://ftp.isi.edu/in-notes/rfc2475.txt, Dec. 1, 1998, XP-002220520, 36 pages.

Nokia et al: "5G URLLC QoS Monitoring solution", SA WG2 Meeting #132, Apr. 8-12, 2019, Xi'an, People's Republic of China, S2-1903659, 2 pages.

Extended European Search Report corresponding to EP Appln. No. 20167463.7, dated Nov. 12, 2020.

\* cited by examiner

| Transport resource | T1 | T2 | | | | T20 |
|---|---|---|---|---|---|---|
| RTT/2 | 1 ms | 0.7 ms | | | | 0.8 ms |

FIG. 7A

| Transport resource | T1 | T2 | T3 | | | T20 |
|---|---|---|---|---|---|---|
| RTT/2 | 1.2 ms | 0.45 ms | 0.74 ms | | | 0.54 ms |

FIG. 7B

| | Network instance 1 | Network instance 2 | Network instance 3 | Network instance 4 |
|---|---|---|---|---|
| DSCP 1 | 1 ms | 0.6 ms | 0.5 ms | 0.7 ms |
| DSCP 2 | 0.4 ms | 0.4 ms | 0.6 ms | |
| DSCP 3 | 0.8 ms | 0.2 ms | | |
| DSCP 4 | | 0.1 ms | | |

FIG. 7C

| | Network instance 1 | Network instance 2 | Network instance 3 | Network instance 4 |
|---|---|---|---|---|
| DSCP 1 | 1.2 ms | 0.7 ms | 0.54 ms | 0.49 ms |
| DSCP 2 | 0.33 ms | 0.5 ms | 0.4 ms | |
| DSCP 3 | 0.72 ms | 0.3 ms | | |
| DSCP 4 | | 0.1 ms | | |

FIG. 7D

BENCHMARKING OF DELAY ESTIMATES IN A 5G NETWORK FOR QUALITY OF SERVICE FLOW SETUP AND MONITORING

CROSS-REFERENCE TO RELATED APPLICATION

This application claims the benefit of U.S. Provisional Application No. 62/827,608, filed Apr. 1, 2019. The entire content of the above-referenced application is hereby incorporated by reference.

TECHNICAL FIELD

Various communication systems may benefit from improved benchmarking of delay estimates.

BACKGROUND

3rd Generation Partnership Project (3GPP) new radio (NR) release (Rel)-16 describes packet delay budget (PDB) division and quality of service (QoS) monitoring. As part of these features, it is desirable to estimate the delay that QoS flows may experience between the user plane function (UPF) anchor and the next generation radio access network (NG-RAN) node. This estimate of network delay may be used for a packet delay budget (PDB) division feature where the NG-RAN node may subtract the network delay from the end to end PDB to derive a radio PDB. Furthermore, with respect to QoS monitoring, if one of the nodes detects that the network delay or the estimate of the cumulated network delay and the radio delay is above a threshold, an alarm may be raised, such as to a session management function.

SUMMARY

In accordance with some embodiments, a method may include performing, by a first network entity, at least one benchmarking procedure of at least one network hop delay per at least one transport resource towards at least one peer network node identified by at least one internet protocol destination address. The method may further include deriving, by the first network entity, for each peer node associated with an internet protocol destination address, estimated network hop delay per (network instance, differentiated services codepoint) pair using at least one existing configured mapping of at least one (network instance, differentiated services codepoint) pair into a transport resource $T_i$ per internet protocol destination address. The method may further include updating, by the first network entity, the first table and the second table for each internet protocol destination address and transmitting the updated second table to a second network entity configured to use the second table during setup of at least one protocol data unit session/quality of service flow to determine at least one (network instance, differentiated services codepoint) pair to be used for at least one network hop to be traversed by at least one quality of service flow.

In accordance with certain embodiments, an apparatus may include means for performing at least one benchmarking procedure of at least one network hop delay per at least one transport resource towards at least one peer network node identified by at least one internet protocol destination address. The apparatus may further include means for deriving, for each peer node associated with an internet protocol destination address, estimated network hop delay per (network instance, differentiated services codepoint) pair using at least one existing configured mapping of at least one (network instance, differentiated services codepoint) pair into a transport resource $T_i$ per internet protocol destination address. The apparatus may further include means for updating the first table and the second table for each internet protocol destination address and transmitting the updated second table to a network entity configured to use the second table during setup of at least one protocol data unit session/quality of service flow to determine at least one (network instance, differentiated services codepoint) pair to be used for at least one network hop to be traversed by at least one quality of service flow.

In accordance with various embodiments, an apparatus may include at least one processor and at least one memory including computer program code. The at least one memory and the computer program code can be configured to, with the at least one processor, cause the apparatus to at least perform at least one benchmarking procedure of at least one network hop delay per at least one transport resource towards at least one peer network node identified by at least one internet protocol destination address. The at least one memory and the computer program code can be further configured to, with the at least one processor, cause the apparatus to at least one derive, for each peer node associated with an internet protocol destination address, estimated network hop delay per (network instance, differentiated services codepoint) pair using at least one existing configured mapping of at least one (network instance, differentiated services codepoint) pair into a transport resource $T_i$ per internet protocol destination address. The at least one memory and the computer program code can be further configured to, with the at least one processor, cause the apparatus to at least update the first table and the second table for each internet protocol destination address and transmitting the updated second table to a network entity configured to use the second table during setup of at least one protocol data unit session/quality of service flow to determine at least one (network instance, differentiated services codepoint) pair to be used for at least one network hop to be traversed by at least one quality of service flow.

In accordance with some embodiments, a non-transitory computer readable medium can be encoded with instructions that may, when executed in hardware, perform a method. The method may include performing at least one benchmarking procedure of at least one network hop delay per at least one transport resource towards at least one peer network node identified by at least one internet protocol destination address. The method may further include deriving, for each peer node associated with an internet protocol destination address, estimated network hop delay per (network instance, differentiated services codepoint) pair using at least one existing configured mapping of at least one (network instance, differentiated services codepoint) pair into a transport resource $T_i$ per internet protocol destination address. The method may further include updating the first table and the second table for each internet protocol destination address and transmitting the updated second table to a network entity configured to use the second table during setup of at least one protocol data unit session/quality of service flow to determine at least one (network instance, differentiated services codepoint) pair to be used for at least one network hop to be traversed by at least one quality of service flow.

In accordance with certain embodiments, a computer program product may perform a method. The method may include performing at least one benchmarking procedure of at least one network hop delay per at least one transport resource towards at least one peer network node identified by at least one internet protocol destination address. The method may further include deriving, for each peer node associated with an internet protocol destination address, estimated network hop delay per (network instance, differentiated services codepoint) pair using at least one existing configured mapping of at least one (network instance, differentiated services codepoint) pair into a transport resource $T_i$ per internet protocol destination address. The method may further include updating the first table and the second table for each internet protocol destination address and transmitting the updated second table to a network entity configured to use the second table during setup of at least one protocol data unit session/quality of service flow to determine at least one (network instance, differentiated services codepoint) pair to be used for at least one network hop to be traversed by at least one quality of service flow.

In accordance with various embodiments, an apparatus may include circuitry configured to perform at least one benchmarking procedure of at least one network hop delay per at least one transport resource towards at least one peer network node identified by at least one internet protocol destination address. The circuitry may further be configured to derive, for each peer node associated with an internet protocol destination address, estimated network hop delay per (network instance, differentiated services codepoint) pair using at least one existing configured mapping of at least one (network instance, differentiated services codepoint) pair into a transport resource $T_i$ per internet protocol destination address. The circuitry may further be configured to update the first table and the second table for each internet protocol destination address and transmitting the updated second table to a network entity configured to use the second table during setup of at least one protocol data unit session/quality of service flow to determine at least one (network instance, differentiated services codepoint) pair to be used for at least one network hop to be traversed by at least one quality of service flow.

In accordance with some embodiments, a method may include receiving, by a first network entity, at least one value of a first table from a second network entity, where each of at least one internet protocol destination address in the first table is associated with an estimated delay per (network instance, differentiated services codepoint) pair entry. The method may further include analyzing, by the first network entity, in response to at least one quality of service flow needing to be set up, at least one characteristic of at least one quality of service flow. The method may further include transmitting, by the first network entity, for each determined network hop to be traversed by the quality of service flow, at least one corresponding signaling associated with the network hop to the second network entity.

In accordance with certain embodiments, an apparatus may include means for receiving at least one value of a first table from a network entity, where each of at least one internet protocol destination address in the first table is associated with an estimated delay per (network instance, differentiated services codepoint) pair entry. The apparatus may further include means for analyzing, in response to at least one quality of service flow needing to be set up, at least one characteristic of at least one quality of service flow. The apparatus may further include means for transmitting for each determined network hop to be traversed by the quality of service flow, at least one corresponding signaling associated with the network hop to the network entity.

In accordance with various embodiments, an apparatus may include at least one processor and at least one memory including computer program code. The at least one memory and the computer program code can be configured to, with the at least one processor, cause the apparatus to at least receive at least one value of a first table from a network entity, where each of at least one internet protocol destination address in the first table is associated with an estimated delay per (network instance, differentiated services codepoint) pair entry. The at least one memory and the computer program code can be further configured to, with the at least one processor, cause the apparatus to at least analyze, in response to at least one quality of service flow needing to be set up, at least one characteristic of at least one quality of service flow. The at least one memory and the computer program code can be further configured to, with the at least one processor, cause the apparatus to at least transmit, for each determined network hop to be traversed by the quality of service flow, at least one corresponding signaling associated with the network hop to the network entity.

In accordance with some embodiments, a non-transitory computer readable medium can be encoded with instructions that may, when executed in hardware, perform a method. The method may include receiving at least one value of a first table from a network entity, where each of at least one internet protocol destination address in the first table is associated with an estimated delay per (network instance, differentiated services codepoint) pair entry. The method may further include analyzing, in response to at least one quality of service flow needing to be set up, at least one characteristic of at least one quality of service flow. The method may further include transmitting, for each determined network hop to be traversed by the quality of service flow, at least one corresponding signaling associated with the network hop to the network entity.

In accordance with certain embodiments, a computer program product may perform a method. The method may include receiving at least one value of a first table from a network entity, where each of at least one internet protocol destination address in the first table is associated with an estimated delay per (network instance, differentiated services codepoint) pair entry. The method may further include analyzing, in response to at least one quality of service flow needing to be set up, at least one characteristic of at least one quality of service flow. The method may further include transmitting, for each determined network hop to be traversed by the quality of service flow, at least one corresponding signaling associated with the network hop to the network entity.

In accordance with various embodiments, an apparatus may include circuitry configured to receive at least one value of a first table from a network entity, where each of at least one internet protocol destination address in the first table is associated with an estimated delay per (network instance, differentiated services codepoint) pair entry. The circuitry may further be configured to analyze, in response to at least one quality of service flow needing to be set up, at least one characteristic of at least one quality of service flow. The circuitry may further be configured to transmit, for each determined network hop to be traversed by the quality of service flow, at least one corresponding signaling associated with the network hop to the network entity.

In accordance with some embodiments, a method may include receiving, by a first network entity, from a second network entity, for each network entity involved in a path where network delay is to be estimated, at least one hop delay measurement request over N4/next generation application protocol including one or more of at least one destination internet protocol address for the first network entity for the hop, at least one network instance, and at least one differentiated services codepoint that the first network entity expects to use. The method may further include deriving, by the first network entity, a second table, by, for each peer node associated with an internet protocol destination address, determining at least one existing configured mapping of at least one network instance into a transport resource $T_i$ per internet protocol destination address. The method may further include updating, by the first network entity, the first table and the second table for each internet protocol destination address and transmitting the updated second table to the second network entity.

In accordance with certain embodiments, an apparatus may include means for receiving, from a network entity, for each network entity involved in a path where network delay is to be estimated, at least one hop delay measurement request over N4/next generation application protocol including one or more of at least one destination internet protocol address for the apparatus for the hop, at least one network instance, and at least one differentiated services codepoint that the apparatus expects to use. The apparatus may further include means for deriving a second table, by, for each peer node associated with an internet protocol destination address, determining at least one existing configured mapping of at least one network instance into a transport resource $T_i$ per internet protocol destination address. The apparatus may further include means for updating the first table and the second table for each internet protocol destination address and transmitting the updated second table to the network entity.

In accordance with various embodiments, an apparatus may include at least one processor and at least one memory including computer program code. The at least one memory and the computer program code can be configured to, with the at least one processor, cause the apparatus to at least receive, from a network entity, for each network entity involved in a path where network delay is to be estimated, at least one hop delay measurement request over N4/next generation application protocol including one or more of at least one destination internet protocol address for the apparatus for the hop, at least one network instance, and at least one differentiated services codepoint that the apparatus expects to use. The at least one memory and the computer program code can be further configured to, with the at least one processor, cause the apparatus to at least derive a second table, by, for each peer node associated with an internet protocol destination address, determining at least one existing configured mapping of at least one network instance into a transport resource $T_i$ per internet protocol destination address. The at least one memory and the computer program code can be further configured to, with the at least one processor, cause the apparatus to at least update the first table and the second table for each internet protocol destination address and transmitting the updated second table to the network entity.

In accordance with some embodiments, a non-transitory computer readable medium can be encoded with instructions that may, when executed in hardware, perform a method. The method may include receiving, from a network entity, for each network entity involved in a path where network delay is to be estimated, at least one hop delay measurement request over N4/next generation application protocol including one or more of at least one destination internet protocol address for the apparatus for the hop, at least one network instance, and at least one differentiated services codepoint that the apparatus expects to use. The method may further include deriving a second table, by, for each peer node associated with an internet protocol destination address, determining at least one existing configured mapping of at least one network instance into a transport resource $T_i$ per internet protocol destination address. The method may further include updating the first table and the second table for each internet protocol destination address and transmitting the updated second table to the network entity.

In accordance with certain embodiments, a computer program product may perform a method. The method may include receiving, from a network entity, for each network entity involved in a path where network delay is to be estimated, at least one hop delay measurement request over N4/next generation application protocol including one or more of at least one destination internet protocol address for the apparatus for the hop, at least one network instance, and at least one differentiated services codepoint that the apparatus expects to use. The method may further include deriving a second table, by, for each peer node associated with an internet protocol destination address, determining at least one existing configured mapping of at least one network instance into a transport resource $T_i$ per internet protocol destination address. The method may further include updating the first table and the second table for each internet protocol destination address and transmitting the updated second table to the network entity.

In accordance with various embodiments, an apparatus may include circuitry configured to receive, from a network entity, for each network entity involved in a path where network delay is to be estimated, at least one hop delay measurement request over N4/next generation application protocol including one or more of at least one destination internet protocol address for the apparatus for the hop, at least one network instance, and at least one differentiated services codepoint that the apparatus expects to use. The circuitry may further be configured to derive a second table, by, for each peer node associated with an internet protocol destination address, determining at least one existing configured mapping of at least one network instance into a transport resource $T_i$ per internet protocol destination address. The circuitry may further be configured to update the first table and the second table for each internet protocol destination address and transmitting the updated second table to the network entity.

In accordance with some embodiments, a method may include transmitting, by a first network entity, to a second network entity, for each network entity involved in a path where network delay is to be estimated, at least one hop delay measurement request over N4/next generation application protocol including one or more of at least one destination internet protocol address for the second network entity for the hop. The method may further include analyzing, by the first network entity, in response to at least one quality of service flow needing to be set up, at least one characteristic of at least one quality of service flow and using the hop delay measurements made by the second network entity to satisfy the at least one characteristics. The method may further include transmitting, by the first network entity, for each determined hop, at least one corresponding signaling associated with the hop to the second network entity.

In accordance with certain embodiments, an apparatus may include means for transmitting, to a network entity, for each network entity involved in a path where network delay is to be estimated, at least one hop delay measurement request over N4/next generation application protocol including one or more of at least one destination internet protocol address for the network entity for the hop. The apparatus may further include means for analyzing, in response to at least one quality of service flow needing to be set up, at least one characteristic of at least one quality of service flow and using the hop delay measurements made by the network entity to satisfy the at least one characteristics. The apparatus may further include means for transmitting, for each determined hop, at least one corresponding signaling associated with the hop to the network entity.

In accordance with various embodiments, an apparatus may include at least one processor and at least one memory including computer program code. The at least one memory and the computer program code can be configured to, with the at least one processor, cause the apparatus to at least transmit, to a network entity, for each network entity involved in a path where network delay is to be estimated, at least one hop delay measurement request over N4/next generation application protocol including one or more of at least one destination internet protocol address for the network entity for the hop. The at least one memory and the computer program code can be further configured to, with the at least one processor, cause the apparatus to at least analyze, in response to at least one quality of service flow needing to be set up, at least one characteristic of at least one quality of service flow and using the hop delay measurements made by the network entity to satisfy the at least one characteristics. The at least one memory and the computer program code can be further configured to, with the at least one processor, cause the apparatus to at least transmit, for each determined hop, at least one corresponding signaling associated with the hop to the network entity.

In accordance with some embodiments, a non-transitory computer readable medium can be encoded with instructions that may, when executed in hardware, perform a method. The method may include transmitting, to a network entity, for each network entity involved in a path where network delay is to be estimated, at least one hop delay measurement request over N4/next generation application protocol including one or more of at least one destination internet protocol address for the network entity for the hop. The method may further include analyzing, in response to at least one quality of service flow needing to be set up, at least one characteristic of at least one quality of service flow and using the hop delay measurements made by the network entity to satisfy the at least one characteristics. The method may further include transmitting, for each determined hop, at least one corresponding signaling associated with the hop to the network entity.

In accordance with certain embodiments, a computer program product may perform a method. The method may include transmitting, to a network entity, for each network entity involved in a path where network delay is to be estimated, at least one hop delay measurement request over N4/next generation application protocol including one or more of at least one destination internet protocol address for the network entity for the hop. The method may further include analyzing, in response to at least one quality of service flow needing to be set up, at least one characteristic of at least one quality of service flow and using the hop delay measurements made by the network entity to satisfy the at least one characteristics. The method may further include transmitting, for each determined hop, at least one corresponding signaling associated with the hop to the network entity.

In accordance with various embodiments, an apparatus may include circuitry configured to transmit, to a network entity, for each network entity involved in a path where network delay is to be estimated, at least one hop delay measurement request over N4/next generation application protocol including one or more of at least one destination internet protocol address for the network entity for the hop. The circuitry may further be configured to analyze, in response to at least one quality of service flow needing to be set up, at least one characteristic of at least one quality of service flow and using the hop delay measurements made by the network entity to satisfy the at least one characteristics. The circuitry may further be configured to transmit, for each determined hop, at least one corresponding signaling associated with the hop to the network entity.

In accordance with some embodiments, a method may include determining, by a first network entity, at a given point in time, each peer internet protocol address for which at least one transport resource is being used by at least one ongoing protocol data unit session and at least one quality of service flow. The method may further include determining, by the first network entity, a first table with estimated network hop delay per transport resource previously determined. The method may further include deriving, by the first network entity, a second table, by, for each peer node associated with an internet protocol destination address, providing the network hop delay per (network instance, differentiated services codepoint) pair using at least one existing configured mapping of at least one (network instance, differentiated services codepoint) pair into a transport resource $T_i$ per internet protocol destination address. The method may further include updating, by the first network entity, the first table and the second table for each internet protocol destination address and transmitting the updated second table to the second network entity.

In accordance with certain embodiments, an apparatus may include means for determining at a given point in time, each peer internet protocol address for which at least one transport resource is being used by at least one ongoing protocol data unit session and at least one quality of service flow. The apparatus may further include means for determining a first table with estimated network hop delay per transport resource previously determined. The apparatus may further include means for deriving a second table, by, for each peer node associated with an internet protocol destination address, providing the network hop delay per (network instance, differentiated services codepoint) pair using at least one existing configured mapping of at least one (network instance, differentiated services codepoint) pair into a transport resource $T_i$ per internet protocol destination address. The apparatus may further include means for updating the first table and the second table for each internet protocol destination address and transmitting the updated second table to the network entity.

In accordance with various embodiments, an apparatus may include at least one processor and at least one memory including computer program code. The at least one memory and the computer program code can be configured to, with the at least one processor, cause the apparatus to at least determine at a given point in time, each peer internet protocol address for which at least one transport resource is being used by at least one ongoing protocol data unit session and at least one quality of service flow. The at least one memory and the computer program code can be further configured to, with the at least one processor, cause the apparatus to at least determine a first table with estimated network hop delay per transport resource previously determined. The at least one memory and the computer program code can be further configured to, with the at least one processor, cause the apparatus to at least derive a second table, by, for each peer node associated with an internet protocol destination address, providing the network hop delay per (network instance, differentiated services codepoint) pair using at least one existing configured mapping of at least one (network instance, differentiated services codepoint) pair into a transport resource $T_i$ per internet protocol destination address. The at least one memory and the computer program code can be further configured to, with the at least one processor, cause the apparatus to at least update the first table and the second table for each internet protocol destination address and transmitting the updated second table to the network entity.

In accordance with some embodiments, a non-transitory computer readable medium can be encoded with instructions that may, when executed in hardware, perform a method. The method may include determining at a given point in time, each peer internet protocol address for which at least one transport resource is being used by at least one ongoing protocol data unit session and at least one quality of service flow. The method may further include determining a first table with estimated network hop delay per transport resource previously determined. The method may further include deriving a second table, by, for each peer node associated with an internet protocol destination address, providing the network hop delay per (network instance, differentiated services codepoint) pair using at least one existing configured mapping of at least one (network instance, differentiated services codepoint) pair into a transport resource $T_i$ per internet protocol destination address. The method may further include updating the first table and the second table for each internet protocol destination address and transmitting the updated second table to the network entity.

In accordance with certain embodiments, a computer program product may perform a method. The method may include determining at a given point in time, each peer internet protocol address for which at least one transport resource is being used by at least one ongoing protocol data unit session and at least one quality of service flow. The method may further include determining a first table with estimated network hop delay per transport resource previously determined. The method may further include deriving a second table, by, for each peer node associated with an internet protocol destination address, providing the network hop delay per (network instance, differentiated services codepoint) pair using at least one existing configured mapping of at least one (network instance, differentiated services codepoint) pair into a transport resource $T_i$ per internet protocol destination address. The method may further include updating the first table and the second table for each internet protocol destination address and transmitting the updated second table to the network entity.

In accordance with various embodiments, an apparatus may include circuitry configured to determine at a given point in time, each peer internet protocol address for which at least one transport resource is being used by at least one ongoing protocol data unit session and at least one quality of service flow. The circuitry may further be configured to determine a first table with estimated network hop delay per transport resource previously determined. The circuitry may further be configured to derive a second table, by, for each peer node associated with an internet protocol destination address, providing the network hop delay per (network instance, differentiated services codepoint) pair using at least one existing configured mapping of at least one (network instance, differentiated services codepoint) pair into a transport resource $T_i$ per internet protocol destination address. The circuitry may further be configured to update the first table and the second table for each internet protocol destination address and transmitting the updated second table to the network entity.

In accordance with some embodiments, a method may include transmitting, by a first network entity, at least one indication to a second network entity comprising at least one new indication in forward action rule per packet forwarding control protocol session (protocol data unit session) indicating which protocol data unit session/quality of service flow is involved in at least one quality of service monitoring feature. The method may further include analyzing, by the first network entity, in response to at least one quality of service flow needing to be set up, at least one characteristic of at least one quality of service flow. The method may further include transmitting, by the first network entity, for each determined hop, at least one corresponding signal associated with the hop to the second network entity.

In accordance with certain embodiments, an apparatus may include means for transmitting at least one indication to a network entity comprising at least one new indication in forward action rule per packet forwarding control protocol session (protocol data unit session) indicating which protocol data unit session/quality of service flow is involved in at least one quality of service monitoring feature. The apparatus may further include means for analyzing, in response to at least one quality of service flow needing to be set up, at least one characteristic of at least one quality of service flow. The apparatus may further include means for transmitting, for each determined hop, at least one corresponding signal associated with the hop to the network entity.

In accordance with various embodiments, an apparatus may include at least one processor and at least one memory including computer program code. The at least one memory and the computer program code can be configured to, with the at least one processor, cause the apparatus to at least transmit at least one indication to a network entity comprising at least one new indication in forward action rule per packet forwarding control protocol session (protocol data unit session) indicating which protocol data unit session/quality of service flow is involved in at least one quality of service monitoring feature. The at least one memory and the computer program code can be further configured to, with the at least one processor, cause the apparatus to at least analyze, in response to at least one quality of service flow needing to be set up, at least one characteristic of at least one quality of service flow. The at least one memory and the computer program code can be further configured to, with the at least one processor, cause the apparatus to at least transmit, for each determined hop, at least one corresponding signal associated with the hop to the network entity.

In accordance with some embodiments, a non-transitory computer readable medium can be encoded with instructions that may, when executed in hardware, perform a method. The method may include transmitting at least one indication to a network entity comprising at least one new indication in forward action rule per packet forwarding control protocol session (protocol data unit session) indicating which protocol data unit session/quality of service flow is involved in at least one quality of service monitoring feature. The method may further include analyzing, in response to at least one quality of service flow needing to be set up, at least one characteristic of at least one quality of service flow. The method may further include transmitting, for each determined hop, at least one corresponding signal associated with the hop to the network entity.

In accordance with certain embodiments, a computer program product may perform a method. The method may include transmitting at least one indication to a network entity comprising at least one new indication in forward action rule per packet forwarding control protocol session (protocol data unit session) indicating which protocol data unit session/quality of service flow is involved in at least one quality of service monitoring feature. The method may further include analyzing, in response to at least one quality of service flow needing to be set up, at least one characteristic of at least one quality of service flow. The method may further include transmitting, for each determined hop, at least one corresponding signal associated with the hop to the network entity.

In accordance with various embodiments, an apparatus may include circuitry configured to transmit at least one indication to a network entity comprising at least one new indication in forward action rule per packet forwarding control protocol session (protocol data unit session) indicating which protocol data unit session/quality of service flow is involved in at least one quality of service monitoring feature. The circuitry may further be configured to analyze, in response to at least one quality of service flow needing to be set up, at least one characteristic of at least one quality of service flow. The circuitry may further be configured to transmit, for each determined hop, at least one corresponding signal associated with the hop to the network entity.

BRIEF DESCRIPTION OF THE DRAWINGS

For proper understanding of this disclosure, reference should be made to the accompanying drawings, wherein:

FIGS. 7(a)-(d) illustrate examples of tables storing echo response results according to certain embodiments.

DETAILED DESCRIPTION

Figure 1:
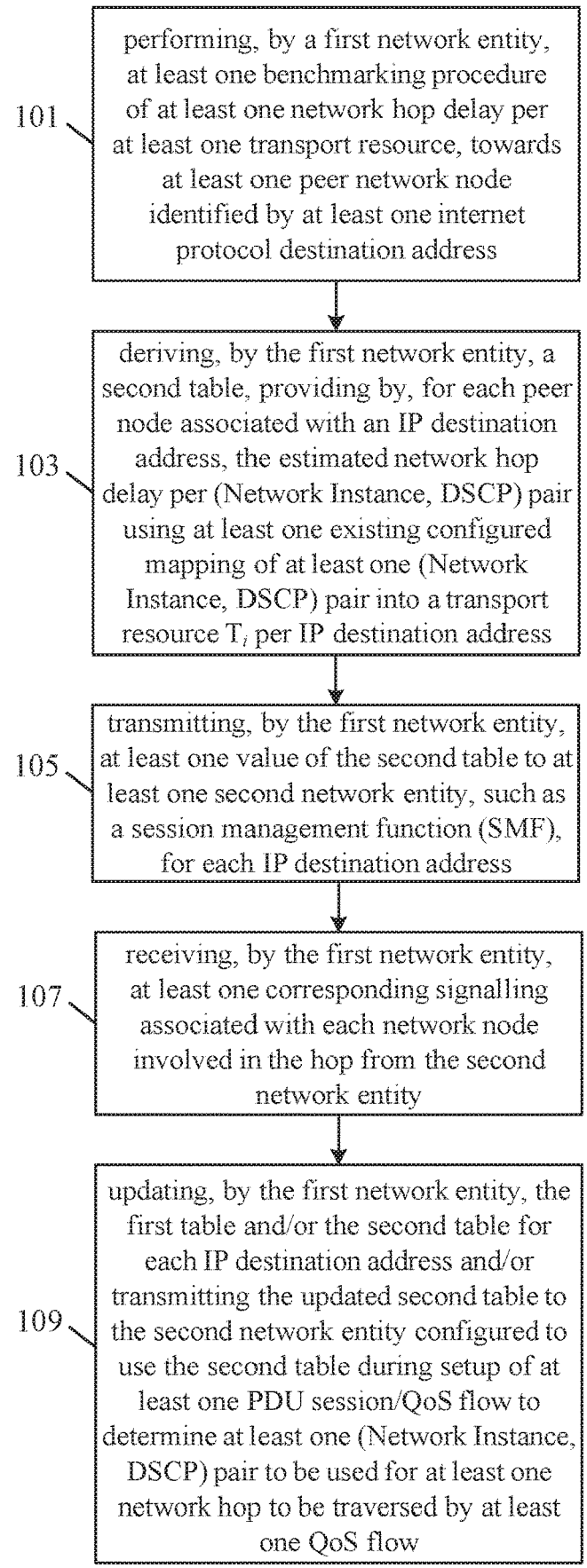
FIG. 1 illustrates an example of a method performed by a network entity according to certain embodiments.

In order to find an estimate of a network delay with precision above a threshold, two techniques have been proposed in 3GPP S2-1902858, called Alternative 1 and Alternative 2. In Alternative 1, a first network node sender adds a timestamp to at least one packet. The last network node receiver compares the receiving time with the included timestamp, and deduces the network delay. It then determines the remaining part of the PDB that it should fulfil for transmitting the packet over the radio. This method assumes that all network nodes are tightly synchronized. Also, delay can be estimated only if QoS flow packets are to be sent; otherwise, it requires the creation of special "dummy" packets containing the time stamp without traffic. Alternative 1 requires tight synchronization between network nodes, and cannot estimate the network delay if there is no traffic unless new dedicated types of packets are created which introduces complexity. Furthermore, Alternative 1 does not provide a per hop delay estimate.

In Alternative 2, per node-level QoS monitoring for each network node in the path generates a GTP echo request message, and then calculates the RTT when receiving the echo response. A network hop delay estimate is determined by computing RTT/2. When a QoS flow packet is sent, each node traversed adds an estimated accumulated time which corresponds to the value of previous estimated accumulated time+estimated processing time in the node+estimated network hop delay of the next hop.

Certain embodiments described herein may have various benefits and/or advantages to overcome the disadvantages described above. For example, the benchmarking of delay estimates remains a nodal process taking place independently of traffic, and furthermore, independently of setting up of QoS flows while still providing estimated values which are precise and usable for actual QoS flow traffic. In addition, the benchmarking of delay estimates may be proactively taken into account by the SMF when deciding the allocation of Network Instance (e.g. Network Instance associated to the S-NSSAI (Single Network Slice Assistance Information) of a slice of the 5G network) and DSCP to be taken into account by each network node involved by the QoS flow at PDU session/QoS flow creation/setup time. Furthermore, the SMF may influence which transport resources the network nodes, such as UPF and NG-RAN nodes, will do the benchmarking.

Certain embodiments further do not require tight synchronization across network nodes, and provide a precise estimate which, even if calculated outside of any packet flow as nodal estimates, may be used efficiently as network delay estimates to compute the accumulated delay budget of a real QoS flow. Certain embodiments further provide a per-hop delay estimate which is regularly updated and independent of any ongoing traffic flow which can be very useful for early diagnostics of delay issues over a segment between two network nodes even in the absence of actual traffic. In addition, the benchmarking of delay estimates may be proactively taken into account by the SMF when deciding the allocation of Network Instance and DSCP to be taken into account by each network node involved by the QoS flow at PDU session/QoS flow creation/setup time. Also, the SMF may influence in variant 2 over which transport resources the network nodes, such as UPF and NG-RAN nodes, may perform the benchmarking. As a result, certain embodiments may result in improved reliability and latency, and reduced power consumption. Finally, the UPF may infer by itself in variant 3 over which a minimum set of transport resources to perform the benchmarking through analysis of which PDU session/QoS flows are involved in the QoS monitoring process and what are their associated Network Instance and DSCP. Thus, certain embodiments are directed to improvements in computer-related technology.

Figure 8:
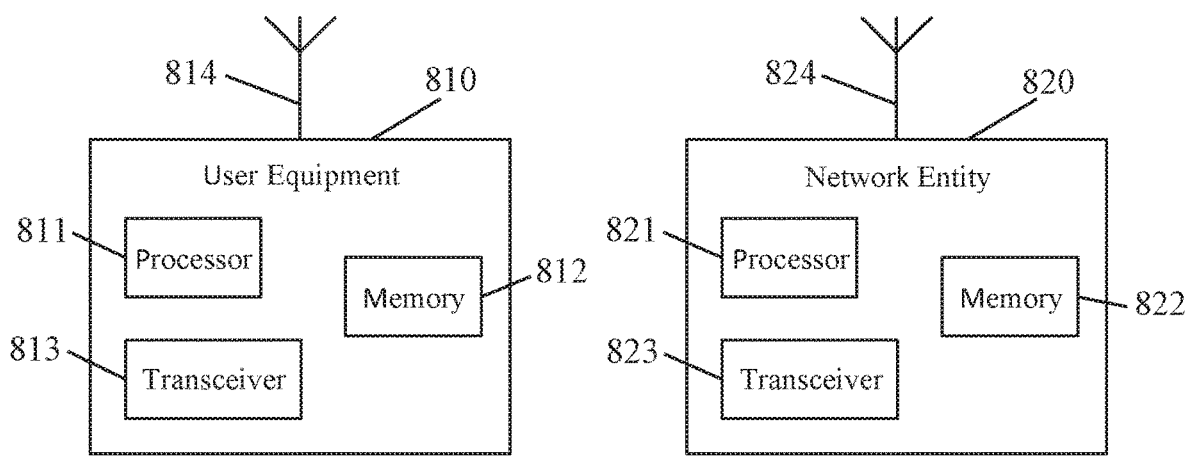
FIG. 8 illustrates an example of a system according to some embodiments.

FIG. 1 illustrates an example of a method performed by a first network entity, such as network entity 820 illustrated in FIG. 8, according to certain embodiments.

In step 101, the first network entity may perform at least one benchmarking procedure of at least one network hop delay per at least one transmit resource, such as T1, T2, T3, etc., towards at least one peer network node identified by at least one internet protocol (IP) destination address, for example, at least one hop between the first network entity and at least one peer network node. In some embodiments, the at least one transport resource may include one or more of a transport network resource used and at least one associated priority setting which may be configured. Furthermore, the at least one network hop delay may be a network hop estimated delay determined by transmitting at least one echo request over the at least one transmit resource $T_i$ and/or measuring round trip time (RTT)/2 when at least one echo response is received in response to the request. The first network entity may store at least one network hop estimate delay per destination IP address in a first table, such as illustrated in FIG. 7(a).

In step 103, the first network entity may derive a second table, such as illustrated in FIG. 7(c), by, for each peer node associated with an IP destination address, determining at least one existing configured mapping of at least one (Network Instance, DSCP) pair into a transport resource $T_i$ per IP destination address. In certain embodiments, the second table may associate each IP destination address with an estimated delay per (Network Instance, DSCP) pair entry.

In step 105, the first network entity may transmit at least one value of the second table to at least one second network entity, such as a session management function (SMF), for each IP destination address.

In step 107, the first network entity may receive at least one corresponding signalling associated with each network node involved in the hop from the second network entity.

In step 109, the first network entity may, at the end of at least one measurement period, update the first table and/or the second table for each IP destination address and/or may transmit the updated second table to the second network entity.

Figure 2:
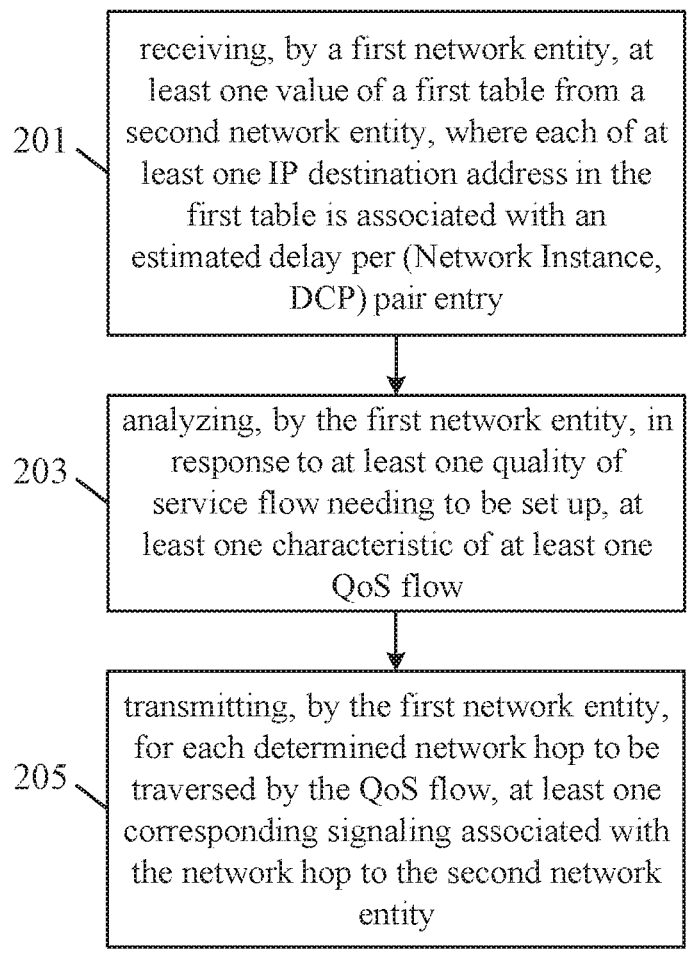
FIG. 2 illustrates an example of another method performed by a network entity according to some embodiments.

FIG. 2 illustrates an example of a method performed by a first network entity, such as network entity 820 illustrated in FIG. 8, according to certain embodiments.

In step 201, the first network entity, such as a session management function (SMF), may receive at least one value of a first table, such as illustrated in FIG. 7(c), from a second network entity, wherein each IP destination address in the first table is associated with an estimated delay per (Network Instance, DSCP) pair entry. In various embodiments, the first network entity may store at least one value of the first table for each IP address. In some embodiments, the at least one value of the first table may be configured to be used for at least one future PDU session and/or QoS flow setup.

In step 203, in response to at least one quality of service (QoS) flow needing to be set up, the first network entity may analyze at least one characteristic of at least one QoS flow, such as 5QI, QoS characteristics, and/or ARP) and/or at least one configuration path, such as at least one network node expected to be traversed, to determine at least one acceptable network delay. In some embodiments, the first network entity may analyze at least one value stored in the first table of each hop involved in the path and/or the suitable total network delay in order to determine at least one (Network Instance, DSCP) pair that should be considered for each hop.

In step 205, for each determined hop, the first network entity may transmit at least one corresponding signaling associated with the hop to the second network entity.

Figure 3:
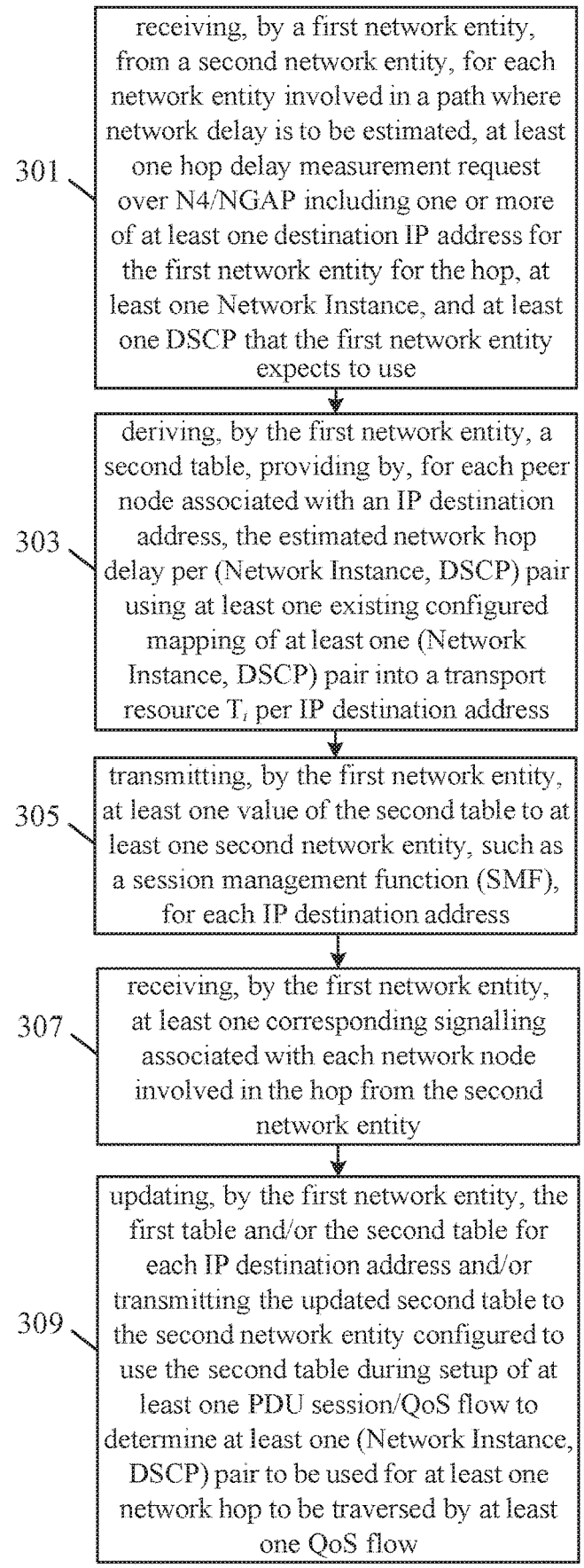
FIG. 3 illustrates an example of another method performed by a network entity according to various embodiments.

FIG. 3 illustrates an example of a method performed by a first network entity, such as network entity 820 illustrated in FIG. 8, according to certain embodiments.

In step 301, the first network entity may receive, from a second network entity, such as a session management function (SMF), for each network entity involved in a path where network delay is to be estimated, at least one hop delay measurement request over N4/NGAP including one or more of at least one destination IP address for the second network entity for the hop, at least one Network Instance, and at least one DSCP that the first network entity expects to use. In some embodiments, the first network entity may also receive at least one measurement period. Furthermore, for each destination IP address, such as for each peer network entity, from an mapping existing in the first network entity of (Network Instance, DSCP) pair into transport resource $T_i$, the first network entity may determine at least one transport resource $T_i$ expected to be used and/or performs at least one network hop delay benchmarking procedure for only the associated at least one transport resource $T_i$. In various embodiments, the at least one at least one transport resource $T_i$ may include one or more of a transport network resource used and at least one priority setting which may be configured for that transport resource. Furthermore, the at least one network hop delay may be a network hop estimated delay determined by transmitting at least one echo request over the at least one transmit resource $T_i$ and/or measuring RTT/2 when at least one echo response is received in response to the request. The first network entity may store at least one such estimated network hop delay per destination IP address in a first table, such as illustrated in FIG. 7(a).

In step 303, the first network entity may derive a second table, such as illustrated in FIG. 7(c), by, for each peer node associated with an IP destination address, using at least one existing configured mapping of at least one (Network Instance, DSCP) pair into a transport resource $T_i$ per IP destination address. In certain embodiments, the second table may associate each IP destination address with an estimated delay per (Network Instance, DSCP) pair entry.

In step 305, the first network entity may transmit at least one value of the second table to the at least one second network entity for each IP destination address.

In step 307, the first network entity may receive at least one corresponding signaling associated with each hop involved in the QoS flow setup path from the second network entity.

In step 309, the first network entity may, at the end of at least one measurement period, update the first table and/or the second table for each IP destination address and/or may transmit the updated second table to the second network entity.

Figure 4:
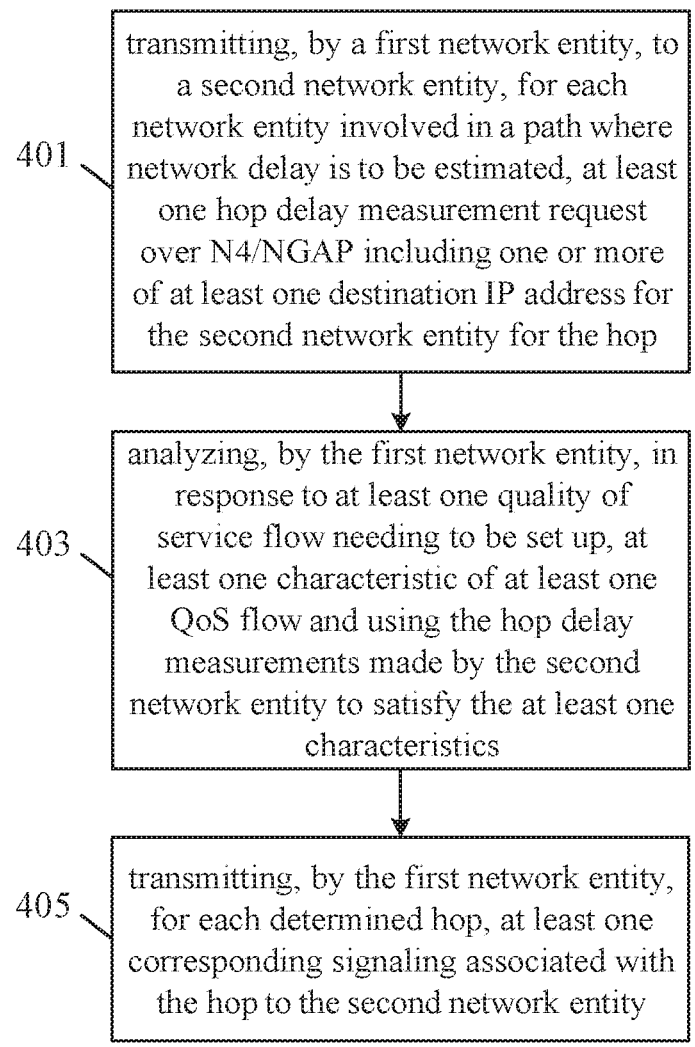
FIG. 4 illustrates an example of another method performed by a network entity according to certain embodiments.

FIG. 4 illustrates an example of a method performed by a first network entity, such as network entity 820 illustrated in FIG. 8, according to certain embodiments.

In step 401, the first network entity may transmit, to a second network entity, which may also be similar to network entity 820 illustrated in FIG. 8, for each network entity involved in a path where network delay is to be estimated, at least one hop delay measurement request over N4/NGAP including one or more of at least one destination IP address for the first network entity for the hop, at least one network instance, and at least one DSCP that the second network entity expects to use. In some embodiments, the first network entity may also transmit at least one measurement period. Furthermore, for each destination IP address, such as for each peer network entity, from an mapping existing in the second network entity of the (Network Instance, DSCP) pair into transport resource $T_i$, the second network entity may determine at least one transport resource $T_i$ expected to be used and/or performs at least one network hop delay benchmarking procedure for only the associated at least one transport resource $T_i$. In various embodiments, the at least one at least one transport resource $T_i$ may include one or more of a transport network resource used and at least one priority setting which may be configured for the transport resource. Furthermore, the at least one network hop delay may be a network hop estimated delay determined by transmitting at least one echo request over the at least one transport resource $T_i$ and/or measuring RTT/2 when at least one echo response is received in response to the request. The second network entity may store at least one estimated network hop delay per destination IP address in a first table, such as illustrated in FIG. 7(a). In some embodiments, the second network entity may derive for each destination IP address from this first table a second table giving the estimated delay per (Network Instance, DSCP) pair such as illustrated in Table 7(c) using a mapping existing in the second network entity of (Network Instance, DSCP) pair into Transport resource $T_i$.

In step 403, in response to at least one quality of service (QoS) flow needing to be set up, the first network entity may analyze at least one characteristic of at least one QoS flow, such as 5QI, QoS characteristics, and/or ARP) and/or at least one configuration path, such as at least one network node expected to be traversed, to determine at least one acceptable network delay. In some embodiments, the first network entity may analyze at least one value stored in the second table, such as illustrated in FIG. 7(c), of each hop involved in the QoS flow path and/or the suitable total network delay in order to determine at least one network instance that should be considered for each hop for a given QoS flow.

In step 405, for each determined hop, the first network entity may transmit at least one corresponding signaling associated with the hop to the second network entity.

Figure 5:
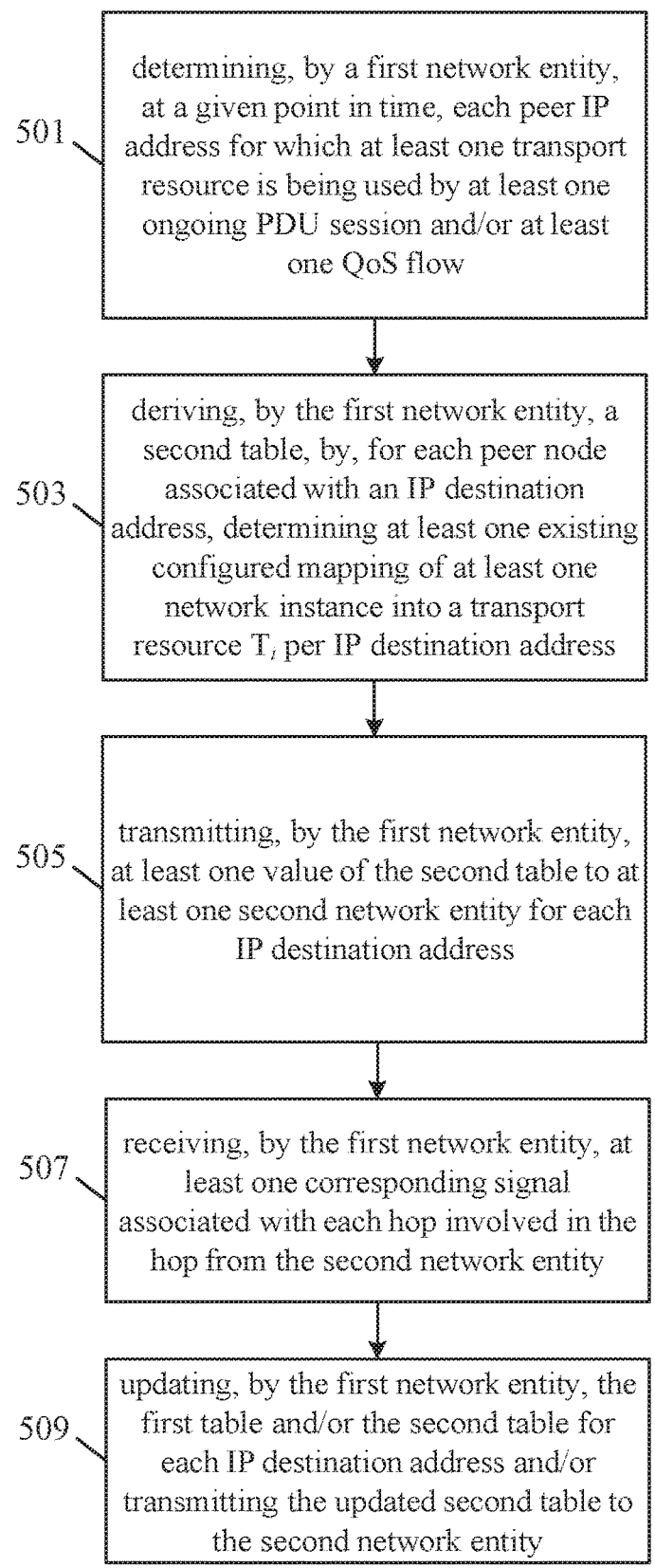
FIG. 5 illustrates an example of another method performed by a network entity according to some embodiments.

FIG. 5 illustrates an example of a method performed by a first network entity, such as network entity 820 illustrated in FIG. 8, according to certain embodiments.

In step 501, the first network entity may determine, at a given point in time, each peer IP address for which at least one transport resource $T_i$ is being used by at least one ongoing PDU session and/or at least one QoS flow. For example, if the first network node is a UPF, the first network node may determine which at least one PDU session is flagged to use at least one QoS monitoring feature since this feature may require that the first network entity insert at least one "accumulated delay" in a GTP extension header. For example, the UPF may have previously received at least one indication from a second network entity, such as network entity 820 illustrated in FIG. 8, for example, at least one new indication in forward action rule (FAR) per PFCP session (PDU session). For each peer IP address and transport resource $T_i$ identified above as being used by at least one PDU session and/or at least one QoS flow, the first network entity may perform at least one network hop delay benchmarking procedure for only the associated at least one transport resource $T_i$. In various embodiments, the at least one at least one transport resource $T_i$ may include one or more of a transport network resource used and at least one priority setting which may be configured for that transport resource. Furthermore, the at least one network hop delay may be a network hop estimated delay determined by transmitting at least one echo request over the at least one transmit resource $T_i$ and/or measuring RTT/2 when at least one echo response is received in response to the request. The first network entity may store at least one estimated network hop delay per destination IP address in a first table, such as illustrated in FIG. 7(a).

In step 503, the first network entity may derive a second table, such as illustrated in FIG. 7(c), by, for each peer node associated with an IP destination address, using at least one existing configured mapping of at least one (Network Instance, DSCP) pair into a transport resource $T_i$ per IP destination address. In certain embodiments, the second table may associate each IP destination address with an estimated delay per (Network Instance, DSCP) pair entry.

In step 505, the first network entity may transmit at least one value of the second table to the at least one second network entity for each IP destination address.

In step 507, the first network entity may receive at least one corresponding signaling associated with each hop involved in the path from the second network entity.

In step 509, the first network entity may, at the end of at least one measurement period, update the first table and/or the second table for each IP destination address and/or may transmit the updated second table to the second network entity.

Figure 6:
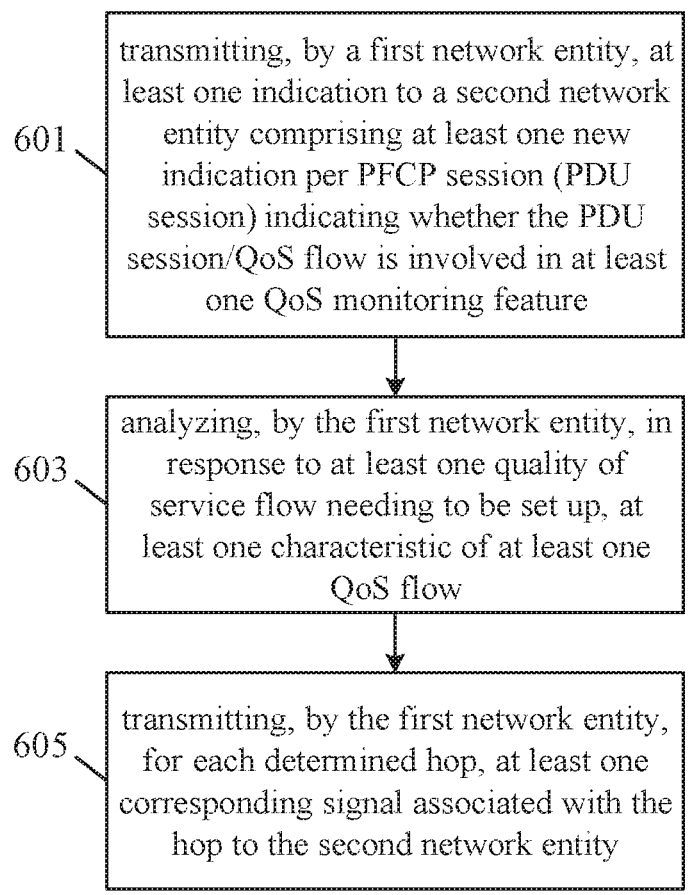
FIG. 6 illustrates an example of another method performed by a network entity according to various embodiments.

FIG. 6 illustrates an example of a method performed by a first network entity, such as network entity 820 illustrated in FIG. 8, according to certain embodiments.

In step 601, the first network entity may transmit at least one indication to a second network entity, such as network entity 820 illustrated in FIG. 8, for example, at least one new indication, such as in forward action rule (FAR), per PFCP session (PDU session) indicating whether the PDU session/QoS flow is involved in QoS monitoring feature. Furthermore, for each destination IP address, such as for each peer network entity, the second network entity may determine from the above at least one transport resource $T_i$ expected to be used for the QoS monitoring feature and/or performs at least one network hop delay benchmarking procedure for only the associated at least one transport resource $T_i$. In various embodiments, the at least one at least one transport resource $T_i$ may include one or more of a transport network resource used and at least one priority setting which may be configured for that transport resource. Furthermore, the at least one network hop delay may be a network hop estimated delay determined by transmitting at least one echo request over the at least one transmit resource $T_i$ and/or measuring RTT/2 when at least one echo response is received in response to the request. The second network entity may store at least one estimated network hop delay per destination IP address in a first table, such as illustrated in FIG. 7(a). The second network entity may derive, for each destination IP address from this first table, a second table giving the estimated delay per (Network Instance, DSCP) pair, such as illustrated in Table 7(c), using a mapping existing in the second network entity of (Network Instance, DSCP) pair into Transport resource $T_i$. The second network entity sends the second table to first network entity.

In step 603, in response to at least one quality of service (QoS) flow needing to be set up, the first network entity may analyze at least one characteristic of at least one QoS flow, such as 5QI, QoS characteristics, and/or ARP) and/or at least one configuration path, such as at least one network node expected to be traversed, to determine at least one acceptable network delay. In some embodiments, the first network entity may analyze at least one value stored in the second table of each hop involved in the path and/or the suitable total network delay in order to determine at least one (Network Instance, DSCP) pair that should be considered for each hop for a given QoS flow.

In step 605, for each determined hop, the first network entity may transmit at least one corresponding signaling associated with the hop to the second network entity.

FIGS. 7(a)-(d) illustrate examples of tables associated with UPF benchmarking of transport resources $T_i$, where echo request/response for FIGS. 7(a) and (b) is RTT/2=1 ms. Furthermore, the echo request/response for FIGS. 7(c) and (d) is RTT/2=0.7 ms.

FIG. 8 illustrates an example of a system according to certain embodiments. In one embodiment, a system may include multiple devices, such as, for example, user equipment 810 and/or network entity 820.

User equipment 810 may include one or more of a mobile device, such as a mobile phone, smart phone, personal digital assistant (PDA), tablet, or portable media player, digital camera, pocket video camera, video game console, navigation unit, such as a global positioning system (GPS) device, desktop or laptop computer, single-location device, such as a sensor or smart meter, or any combination thereof.

Network entity 820 may be one or more of a base station, such as an evolved node B (eNB) or 5G or New Radio node B (gNB), a serving gateway, a session management function (SMF), a user plane function (UPF), a 5G NG-RAN node, a server, and/or any other access node or combination thereof. Furthermore, network entity 820 and/or user equipment 810 may be one or more of a citizens broadband radio service device (CBSD).

One or more of these devices may include at least one processor, respectively indicated as 811 and 821. Processors 811 and 821 may be embodied by any computational or data processing device, such as a central processing unit (CPU), application specific integrated circuit (ASIC), or comparable device. The processors may be implemented as a single controller, or a plurality of controllers or processors.

At least one memory may be provided in one or more of devices indicated at 812 and 822. The memory may be fixed or removable. The memory may include computer program instructions or computer code contained therein. Memories 812 and 822 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate from the one or more processors. Furthermore, the computer program instructions stored in the memory and which may be processed by the processors may be any suitable form of computer program code, for example, a compiled or interpreted computer program written in any suitable programming language. Memory may be removable or non-removable.

Processors 811 and 821 and memories 812 and 822 or a subset thereof, may be configured to provide means corresponding to the various blocks of FIGS. 1-7. Although not shown, the devices may also include positioning hardware, such as GPS or micro electrical mechanical system (MEMS) hardware, which may be used to determine a location of the device. Other sensors are also permitted and may be included to determine location, elevation, orientation, and so forth, such as barometers, compasses, and the like.

As shown in FIG. 8, transceivers 813 and 823 may be provided, and one or more devices may also include at least one antenna, respectively illustrated as 814 and 824. The device may have many antennas, such as an array of antennas configured for multiple input multiple output (MIMO) communications, or multiple antennas for multiple radio access technologies. Other configurations of these devices, for example, may be provided. Transceivers 813 and 823 may be a transmitter, a receiver, or both a transmitter and a receiver, or a unit or device that may be configured both for transmission and reception.

The memory and the computer program instructions may be configured, with the processor for the particular device, to cause a hardware apparatus such as user equipment to perform any of the processes described below (see, for example, FIGS. 1-7). Therefore, in certain embodiments, a non-transitory computer-readable medium may be encoded with computer instructions that, when executed in hardware, perform a process such as one of the processes described herein. Alternatively, certain embodiments may be performed entirely in hardware.

In certain embodiments, an apparatus may include circuitry configured to perform any of the processes or functions illustrated in FIGS. 1-7. For example, circuitry may be hardware-only circuit implementations, such as analog and/or digital circuitry. In another example, circuitry may be a combination of hardware circuits and software, such as a combination of analog and/or digital hardware circuit(s) with software or firmware, and/or any portions of hardware processor(s) with software (including digital signal processor(s)), software, and at least one memory that work together to cause an apparatus to perform various processes or functions. In yet another example, circuitry may be hardware circuit(s) and or processor(s), such as a microprocessor(s) or a portion of a microprocessor(s), that include software, such as firmware for operation. Software in circuitry may not be present when it is not needed for the operation of the hardware.

Figure 9:
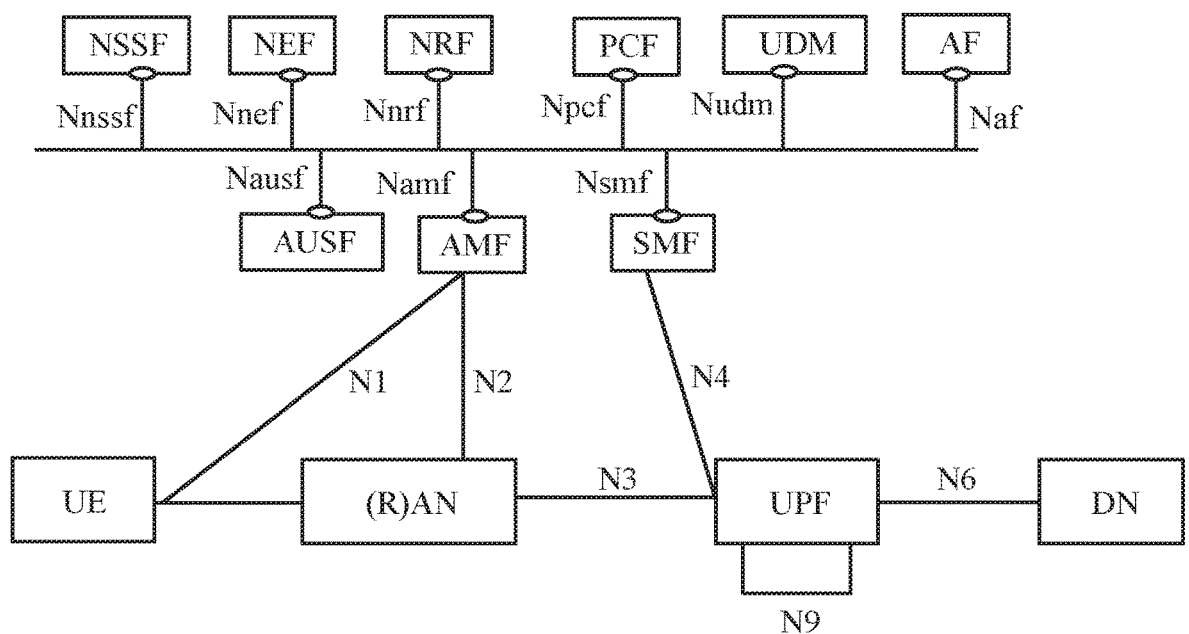
FIG. 9 illustrates an example of a system architecture according to various embodiments.

FIG. 9 illustrates a 5G non-roaming reference architecture according to certain embodiments. One or more of at least one network slice selection function (NSSF), at least one network exposure function (NEF), at least one network repository function (NRF), at least one policy control function (PCF), at least one universal data management (UDM) function, and at least one application function (AF) may be communication with at least one authentication server function (AUSF), at least one core access and mobility management function (AMF), and at least one session management function (SMF). In addition, at least one of these entities may be in communication with one or more of at least one user equipment (UE), radio access network (RAN), at least one user plane function (UPF), and at least one data network (DN).

The features, structures, or characteristics of certain embodiments described throughout this specification may be combined in any suitable manner in one or more embodiments. For example, the usage of the phrases "certain embodiments," "some embodiments," "other embodiments," or other similar language, throughout this specification refers to the fact that a particular feature, structure, or characteristic described in connection with the embodiment may be included in at least one embodiment of the present invention. Thus, appearance of the phrases "in certain embodiments," "in some embodiments," "in other embodiments," or other similar language, throughout this specification does not necessarily refer to the same group of embodiments, and the described features, structures, or characteristics may be combined in any suitable manner in one or more embodiments.

One having ordinary skill in the art will readily understand that certain embodiments discussed above may be practiced with steps in a different order, and/or with hardware elements in configurations which are different than those which are disclosed. Therefore, it would be apparent to those of skill in the art that certain modifications, variations, and alternative constructions would be apparent, while remaining within the spirit and scope of the invention. In order to determine the metes and bounds of the invention, therefore, reference should be made to the appended claims.

Partial Glossary

3GPP 3rd Generation Partnership Project
ARP Allocation, Retention, Priority

DSCP Differentiated Services Codepoint
eMBB Enhanced Mobile Broadband
eNB Evolved Node B
EPC Evolved Packet Core
FAR Forward Action Rule
gNB Next Generation eNB
GPS Global Positioning System
IP Internet Protocol
LBT Listen Before Talk
LTE Long-Term Evolution
MCS Modulation and Coding Scheme
MME Mobility Management Entity
MTC Machine-Type Communications
NGAP Next Generation Application Protocol
NR New Radio
NR-U New Radio Unlicensed
PBCH Physical Broadcast Channel
PDCCH Physical Downlink Control Channel
PDCP Packet Data Convergence Protocol
PDSCH Physical Downlink Shared Channel
PDU Protocol Data Unit
PFCP Packet Forwarding Control Protocol
PUCCH Physical Uplink Control Channel
PUSCH Physical Uplink Shared Channel
QoS Quality of Service
RAN Radio Access Network
RTT Round Trip Time
S-NSSAI Single Network Slice Assistance Information
UE User Equipment
UL Uplink
UPF User Plane Function
URLLC Ultra-Reliable and Low-Latency Communication
WLAN Wireless Local Area Network

We claim:

1. An apparatus, comprising:
at least one processor; and
at least one memory including computer program code;
the at least one memory and the computer program code configured to, with the at least one processor, cause the apparatus at least to:
perform at least one benchmarking procedure of at least one network hop delay per at least one transport resource towards at least one peer network node identified by at least one internet protocol destination address, wherein the at least one transport resource comprises at least one associated priority setting;
derive, for each peer node associated with an internet protocol destination address, estimated network hop delay per pair using at least one existing configured mapping of at least one pair into a transport resource Ti per internet protocol destination address, wherein each pair comprises a network instance and a differentiated services codepoint; and
transmit the derived estimated network hop delay to a network entity.

2. The apparatus according to claim 1, wherein the apparatus comprises a user plane function.

3. The apparatus according to claim 1, wherein the network entity comprises a session management function.

4. An apparatus, comprising:
at least one processor; and
at least one memory including computer program code;
the at least one memory and the computer program code configured to, with the at least one processor, cause the apparatus at least to:
receive at least one value of a first table from a network entity, where each of at least one internet protocol destination address in the first table is associated with an estimated delay per pair entry, wherein each pair entry comprises a network instance and a differentiated services codepoint;
analyze, in response to at least one quality of service flow needing to be set up, at least one characteristic of at least one quality of service flow, wherein the at least one characteristic comprises at least one of a quality of service identifier, quality of service characteristic, or allocation and retention priority; and
transmit, for each determined network hop to be traversed by the quality of service flow, at least one corresponding signaling associated with the network hop to the network entity.

5. The apparatus according to claim 4, wherein the apparatus comprises a session management function.

6. The apparatus according to claim 4, wherein the network entity comprises a user plane function.

7. An apparatus, comprising:
at least one processor; and
at least one memory including computer program code;
the at least one memory and the computer program code configured to, with the at least one processor, cause the apparatus at least to:
receive, from a network entity, for each network entity involved in a path where network delay is to be estimated, at least one hop delay measurement request over N4/next generation application protocol including one or more of at least one destination internet protocol address for the apparatus for the hop, at least one network instance, and at least one differentiated services codepoint that the apparatus expects to use;
derive a table by, for each peer node associated with an internet protocol destination address, determining at least one existing configured mapping of at least one network instance into a transport resource Ti per internet protocol destination address, wherein the at least one transport resource comprises at least one associated priority setting; and
transmit the derived table to the network entity.

8. The apparatus according to claim 7, wherein the apparatus comprises a user plane function.

9. The apparatus according to claim 7, wherein the network entity comprises a session management function.

* * * * *